United States Patent
Yang et al.

(10) Patent No.: US 11,281,588 B2
(45) Date of Patent: Mar. 22, 2022

(54) METHOD, APPARATUS AND COMPUTER PROGRAM PRODUCT FOR MANAGING I/O OPERATION USING PREDICTION MODEL TO PREDICT STORAGE AREA TO BE ACCESSED

(71) Applicant: EMC IP Holding Company LLC, Hopkinton, MA (US)

(72) Inventors: Lifeng Yang, Beijing (CN); Ruiyong Jia, Beijing (CN); Xinlei Xu, Beijing (CN); Yousheng Liu, Beijing (CN); Jian Gao, Beijing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 16/569,130

(22) Filed: Sep. 12, 2019

(65) Prior Publication Data
US 2020/0133864 A1 Apr. 30, 2020

(30) Foreign Application Priority Data
Oct. 29, 2018 (CN) .......................... 201811271488.6

(51) Int. Cl.
*G06F 3/06* (2006.01)
*G06F 12/0862* (2016.01)
*G06N 5/04* (2006.01)

(52) U.S. Cl.
CPC .......... *G06F 12/0862* (2013.01); *G06N 5/04* (2013.01); *G06F 2212/1021* (2013.01); *G06F 2212/602* (2013.01); *G06F 2212/6024* (2013.01)

(58) Field of Classification Search
CPC ......... G06F 12/0862; G06F 2212/1021; G06F 2212/602; G06F 2212/6024; G06F 3/061; G06F 3/0644; G06F 3/0656; G06F 2212/6026; G06N 5/04; G06N 5/005; G06N 7/005
See application file for complete search history.

(56) References Cited

U.S. PATENT DOCUMENTS

| 6,529,998 | B1 | 3/2003 | Yochai et al. |
| 6,721,870 | B1 | 4/2004 | Yochai et al. |
| 8,069,310 | B1 | 11/2011 | Levin-Michael et al. |

(Continued)

OTHER PUBLICATIONS

Dezhic, Egor. Understanding Probabilistic Graphical Models. May 22, 2018 [online], [retrieved on Mar. 28, 2021], Retrieved from the Internet <URL: https://edezhic.medium.com/understanding-probabilistic-graphical-models-658b6fa40184> (Year: 2018).*

(Continued)

*Primary Examiner* — Larry T Mackall
(74) *Attorney, Agent, or Firm* — Bainwoodhuang

(57) ABSTRACT

Techniques manage an input/output (I/O) operation. Such techniques involve estimating a first storage area in a storage device to be accessed by an upcoming random I/O operation, first data being stored in the estimated first storage area. Such techniques further involve, before the random I/O operation is executed, pre-fetching the first data from the first storage area into a cache associated with the storage device. Such techniques enable implementation of the cache pre-fetch for random I/O operations, thereby effectively improving the performance of data access.

17 Claims, 8 Drawing Sheets

(56) References Cited

U.S. PATENT DOCUMENTS

| | | | |
|---|---|---|---|
| 9,830,266 B1 | 11/2017 | Yu et al. | |
| 10,095,624 B1 | 10/2018 | Visvanathan et al. | |
| 2003/0200075 A1* | 10/2003 | Meng | G06Q 10/10 703/22 |
| 2004/0123043 A1* | 6/2004 | Rotithor | G06F 12/0215 711/137 |
| 2011/0173398 A1* | 7/2011 | Boyle | G06F 12/0862 711/137 |
| 2014/0030688 A1* | 1/2014 | Lolli | G09B 7/00 434/350 |
| 2014/0100829 A1* | 4/2014 | Mould | G16H 50/50 703/2 |
| 2014/0229681 A1* | 8/2014 | McNutt | G06F 12/0862 711/137 |
| 2015/0032967 A1* | 1/2015 | Udayashankar | G06F 12/0862 711/137 |
| 2015/0212943 A1* | 7/2015 | Yang | G06F 12/0862 711/137 |
| 2016/0196505 A1* | 7/2016 | Katsuki | G06N 20/00 706/12 |
| 2018/0089087 A1* | 3/2018 | Chang | G06F 12/0862 |

OTHER PUBLICATIONS

Tyagi, Piyush,. Naive Bayes Classification. Medium, [online Dec. 29, 2018], [retrieved on Sep. 23, 2021]. Retrieved from the Internet < URL: https://medium.com/@pytyagi/naive-bayes-classification-c27ee13b7cb8> (Year: 2018).*

* cited by examiner

METHOD, APPARATUS AND COMPUTER PROGRAM PRODUCT FOR MANAGING I/O OPERATION USING PREDICTION MODEL TO PREDICT STORAGE AREA TO BE ACCESSED

CROSS-REFERENCE TO RELATED APPLICATION

This application claims priority to Chinese Patent Application No. CN201811271488.6, on file at the China National Intellectual Property Administration (CNIPA), having a filing date of Oct. 29, 2018, and having "METHOD, APPARATUS AND COMPUTER PROGRAM PRODUCT FOR MANAGING I/O OPERATION" as a title, the contents and teachings of which are herein incorporated by reference in their entirety.

FIELD

Embodiments of the present disclosure generally relate to the field of data storage, and specifically to a method, an apparatus and a computer program product for managing an input/output (I/O) operation.

BACKGROUND

Cache pre-fetch is a technique used by computer processors to improve access performance by fetching an instruction or data from a slower storage device to a cache before it is actually needed. The performance of cache pre-fetch depends on its ability to predict future I/O patterns. In conventional schemes, cache pre-fetch is generally only applicable to a sequential I/O pattern. In such a sequential I/O pattern, a range of addresses in which the requested data is stored in the storage device are sequential (for example, access to audio or video data). These schemes are usually not applicable to a random I/O pattern such as access to a database. In such a random I/O pattern, the range of addresses in which the requested data is stored in the storage device are randomly or pseudo-randomly distributed.

SUMMARY

Embodiments of the present disclosure provide a method, an apparatus and a computer program product for managing an input/output (I/O) operation.

In a first aspect of the present disclosure, there is provided a method for managing an I/O operation. The method includes: estimating a first storage area in a storage device to be accessed by an upcoming random I/O operation, first data being stored in the estimated first storage area; and before the random I/O operation is executed, pre-fetching the first data from the first storage area into a cache associated with the storage device.

In a second aspect of the present disclosure, there is provided an apparatus for managing an I/O operation. The apparatus includes at least one processing unit and at least one memory. The at least one memory is coupled to the at least one processing unit and stores instructions for execution by the at least one processing unit. The instructions, when executed by the at least one processing unit, cause the apparatus to perform acts including: estimating a first storage area in a storage device to be accessed by an upcoming random I/O operation, first data being stored in the estimated first storage area; and before the random I/O operation is executed, pre-fetching the first data from the first storage area into a cache associated with the storage device.

In a third aspect of the present disclosure, there is provided a computer program product that is tangibly stored on a non-transitory computer storage medium and includes machine-executable instructions. The machine-executable instructions, when being executed by an apparatus, cause the apparatus to execute any step of the method according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features, and advantages of example embodiments of the present disclosure will become more apparent from the following detailed description with reference to the accompanying drawings, in which the same reference symbols refer to the same elements.

Throughout the drawings, the same or corresponding reference symbols are used to indicate the same or corresponding parts.

DETAILED DESCRIPTION OF EMBODIMENTS

Figure 1:
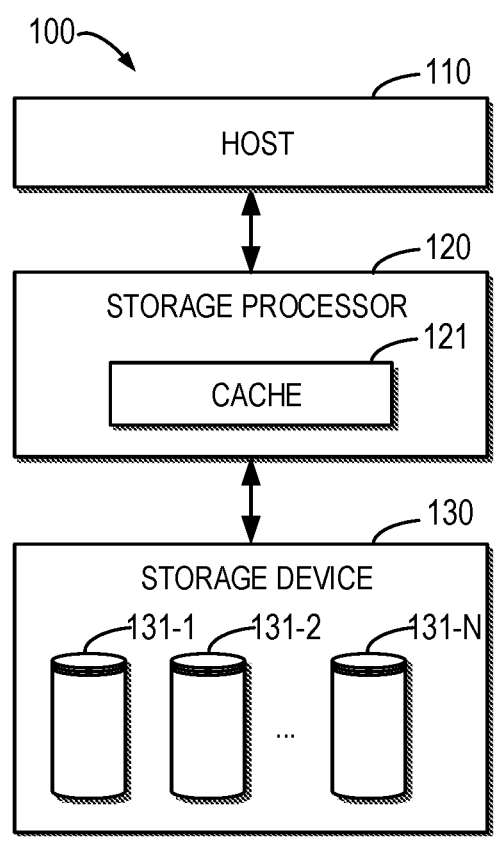
FIG. 1 illustrates a schematic diagram of an example environment in which embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described as follows in greater detail with reference to the drawings. Although preferred embodiments of the present disclosure are illustrated in the drawings, it is to be understood that the present disclosure described herein can be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." Terms "a first", "a second" and others can denote different or identical objects. The following text may also contain other explicit or implicit definitions.

As stated above, cache pre-fetch is a technique used by computer processors to improve access performance by fetching an instruction or data from a slower storage device to a cache before it is actually needed. The performance of cache pre-fetch depends on its ability to predict future I/O patterns.

In conventional schemes, cache pre-fetch is generally only applicable to a sequential I/O pattern. In such a sequential I/O pattern, a range of addresses in which the requested data is stored in the storage device are sequential (for example, access to audio or video data). Some conventional schemes rely on the size of the data involved in an I/O operation (also known as "I/O size") to characterize the sequential data stream, thereby causing a random I/O of a similar size to trigger invalid cache pre-fetch. Some conventional schemes delay prefetching in order to avoid the above problems, thereby wasting some opportunities for effective prefetching. Moreover, these schemes are usually not applicable to a random I/O pattern such as access to a database. In such a random I/O pattern, the range of addresses in which the requested data is stored in the storage device are randomly or pseudo-randomly distributed. The random I/O pattern will disable the cache pre-fetch according to the conventional schemes.

Embodiments of the present disclosure propose a scheme for managing an I/O operation, so as to address one or more of the above problems and other potential problems. This scheme implements a new pre-fetch mechanism for random I/O operations based on a statistical method. In the meantime, the conventional schemes can be used for sequential I/O operations. This enables the scheme to implement cache prefetching for both the sequential I/O pattern and the random I/O pattern, thereby improving the overall performance of the system. In addition, the solution enables the prediction of the pattern of future I/O operations and automatically adjusts the parameters of the prediction model, so as to improve the hit rate of the cache pre-fetch for random I/O operations.

Example embodiments of the present disclosure will be discussed in detail below with reference to the drawings.

FIG. 1 illustrates a block diagram of an example environment 100 in which embodiments of the present disclosure can be implemented. As shown in FIG. 1, the environment 100 includes a host 110, a storage processor 120, and a storage device 130. It is to be understood that the structure of the environment 100 is described only for the purpose of illustration, without suggesting any limitation to the scope of the present disclosure. For example, embodiments of the present disclosure may also be applied to an environment that is different from the environment 100.

In the environment 100, the host 110 may be, for example, any physical computer, virtual machine or server that runs a user application. The host 110 may send an input/output (I/O) request to the storage processor 120, for example, for reading data from the storage device 130 and/or writing data to the storage device 130. In response to receiving a read request from the host 110, the storage processor 120 may read the data from the storage device 130 and return the read data to the host 110. In response to receiving a write request from the host 110, the storage processor 120 may write data to the storage device 130. The Storage device 130 may include a plurality of disks 131-1, 131-2 . . . 131-N (collectively or individually referred to as "disk 131"). The "disk" as used herein may refer to any non-volatile storage medium currently known or to be developed in the future, such as a magnetic disk, optical disk, or solid state disk (SSD).

As shown in FIG. 1, the storage processor 120 may include a cache 121 for temporarily storing frequently-accessed data in a high speed storage medium such as a dynamic random access memory (DRAM), so as to improve access performance of the system. For example, the I/O request from the host 110 will firstly be forwarded to the cache 121. When the data to which the I/O request is directed has been cached in the cache 121 (also referred to as a "cache hit"), the I/O request can be responded to by directly accessing the data in the cache 121. Conversely, if the data to which the I/O request is directed is not cached in the cache 121 (also referred to as a "cache miss"), the I/O request will be forwarded to the storage device 130 to access corresponding data from the storage device 130.

In some cases, the storage processor 120 may pre-fetch data from the storage device 130 into the cache 121 before the data is actually needed. For example, the storage processor 120 may determine when to pre-fetch data from the storage device 130 and how much data is to be pre-fetched based on a previous I/O access pattern. Pre-fetching too little data will make it probable that a subsequent I/O still needs to access data from the storage device 130, thereby failing to improve the performance of accessing data. Pre-fetching too much data will cause waste of limited resources in the cache 121.

In some embodiments, the storage processor 120 may implement cache pre-fetching using one of the following two pre-fetch mechanisms (or circuits): read more and read ahead. The first pre-fetch mechanism refers to circuitry that reads more data than the data requested by the host. The second pre-fetch mechanism means that the cache issues a separate read of cache pages based on the address that the host is currently reading and the address that the cache believes the host will access next.

Figure 2:
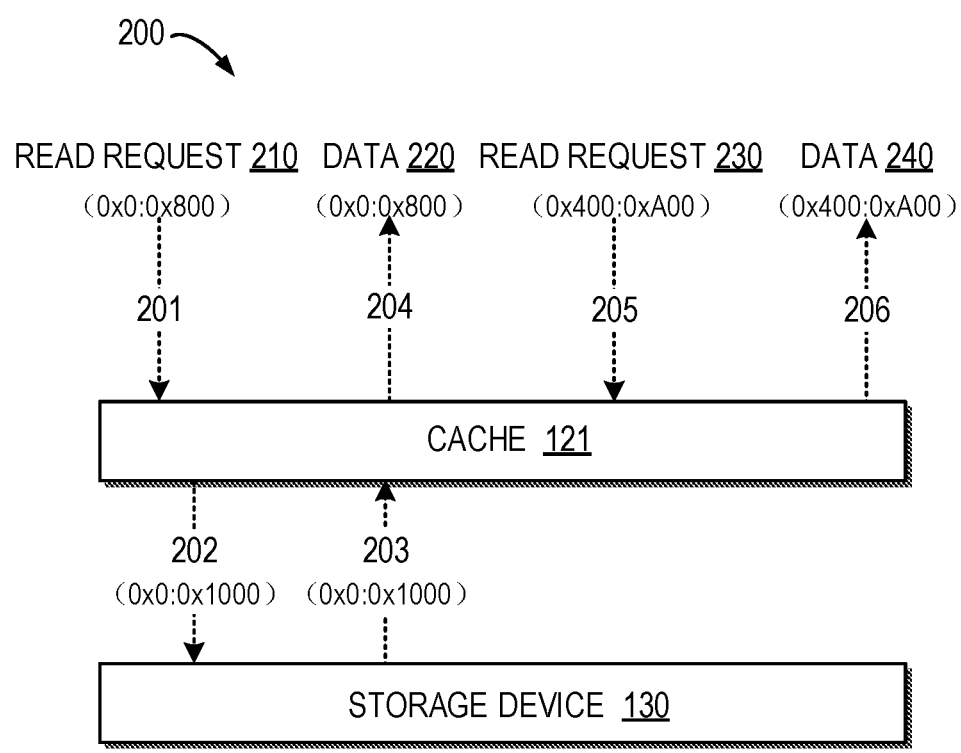
FIG. 2 illustrates a schematic diagram of a cache pre-fetch mechanism in a conventional scheme.

FIG. 2 illustrates a schematic diagram of a cache pre-fetch mechanism in accordance with an embodiment of the present disclosure. FIG. 2 shows the "read more" pre-fetch mechanism. As shown in FIG. 2, a read request 210 issued by the host for example requests to read data with a start address 0x0 and a length 0x800. The request is sent 201 to the cache 121 which determines that the data is missed, and thus loads the data from the underlying storage device 130. The cache 121 may estimate whether more data needs to be read based on a prediction method which will be described in detail below. As shown in FIG. 2, it is assumed here that the cache 121 estimates that more data needs to be read and also estimates a range of addresses which the upcoming I/O operation is directed to (e.g., the start address is 0x0 and the length is 0x1000). Accordingly, the cache 121 may send 202 a request to the storage device 130 to read data with a start address 0x0 and a length 0x1000. The storage device 130 returns 203 data with the start address 0x0 and the length 0x1000 to the cache 121 for storage in a cache page of the cache 121. The cache 121 may only return 204, to the host, the data 220 with the start address 0x0 and the length 0x800 that is requested by the host. Then, another read request 230 is sent 205 to the cache 121, which for example requests to read data with a start address 0x400 and a length 0x600. Because the data has been pre-stored at the cache 121, the cache 121 does not need to load the data from the storage device 130, but instead directly returns 205 the data 240 to the host.

In order to enable prediction of the range of addresses involved in an upcoming I/O operation, embodiments of the present disclosure propose an address range prediction mechanism based on Bayesian inference. Bayesian inference is a statistical reasoning method in which Bayes' theorem is used to update the probability for a hypothesis as more evidence or information becomes available. Bayesian inference is an important technique in statistics and widely used in many areas such as machine learning. In some embodiments, a prediction model may be obtained based on Bayesian inference to implement prediction of the address distribution of I/O operations of the random pattern. Specifically, the address distribution probability of future random I/O operations for a predetermined address space may be estimated by obtaining an I/O probability mass function in the predetermined address space, thereby implementing the cache pre-fetch based on the estimated address range involved in a future random I/O operation.

As described above, the pattern of I/O operations may be classified into sequential I/O and random I/O. The sequential I/O means that the range of addresses in which the requested data is stored in the storage device are sequential (e.g., access to audio or video data). The random I/O means that the range of addresses in which the requested data is stored in the storage device are randomly or pseudo-randomly distributed (e.g., an I/O request from a database). In some embodiments, the address distribution of I/O operations in the random pattern may be approximated by a combination of several Gaussian distributions (i.e., normal distributions).

Bayesian inference derives a posterior probability as a consequence of two antecedents. The two antecedents are a prior probability and a "likelihood function" derived from a statistical model for the observed data. Bayesian inference computes the posterior probability according to the following Equation (1):

$$P(C_i \mid X) = \frac{P(X \mid C_i)P(C_i)}{P(X)} \quad \text{Equation (1)}$$

where $P(C_i)$, the prior probability, is the estimate of the probability of the hypothesis before the data of the current evidence is observed. $P(C_i|X)$, the posterior probability, is the probability of $C_i$ given X, i.e., after X is observed. $P(X)$ is the probability of observing X given $C_i$. As a likelihood function of X, $P(X)$ indicates the compatibility of the evidence with the given hypothesis. The likelihood function is a function of the evidence X, while the posterior probability is a function of the hypothesis $C_i$.

Therefore, the critical point about Bayesian inference is that it provides a principled way of combining new evidence with prior beliefs, through the application of Bayes' rule. Furthermore, Bayes' rule can be applied iteratively: after observing some evidence, the resulting posterior probability may then be treated as a prior probability, and a new posterior probability may be computed from new evidence. This procedure is termed "Bayesian updating".

Figure 3:
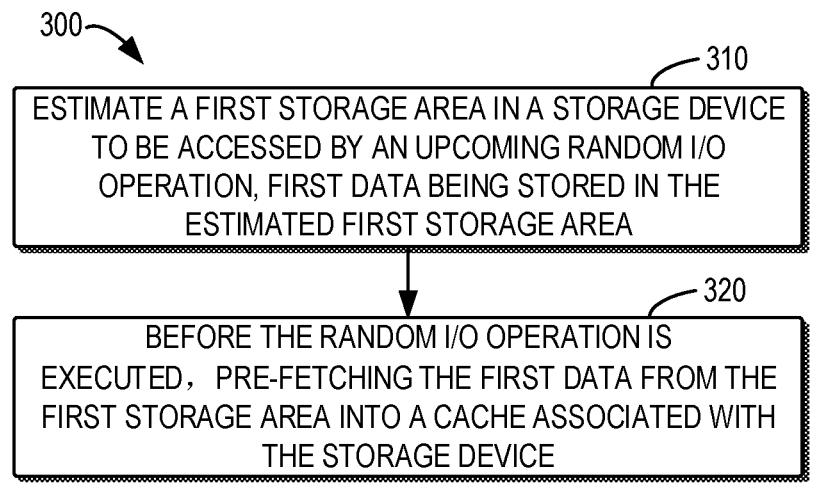
FIG. 3 illustrates a flowchart of an example method for managing an I/O operation according to embodiments of the present disclosure.

FIG. 3 illustrates a flowchart of an example method 300 for cache pre-fetch in accordance with an embodiment of the present disclosure. The method 300 may be performed for example at the storage processor 120 as shown in FIG. 1. It is to be understood that the method 300 may also include additional blocks not shown and/or may omit the illustrated blocks, and the scope of the present disclosure is not limited in this respect.

At block 310, the storage processor 120 estimates a storage area (also referred to herein as a "first storage area") in a storage device to be accessed by an upcoming random I/O operation.

In some embodiments, the storage processor 120 may utilize Bayesian inference to obtain a prediction model for estimating a storage area in the storage device to be accessed by the upcoming random I/O operation, and utilize the prediction model to estimate the first storage area.

In some embodiments, the prediction model may be initialized first. That is, an initial prediction model can be obtained. As used herein, "initialization" here refers to determining a set of initial parameters for the prediction model. The initialized prediction model may be used to estimate the storage area to be accessed by an upcoming random I/O operation. After the initialized prediction model is obtained, the prediction model may be utilized to estimate the storage area in the storage device to be accessed by an upcoming random I/O operation. As described further below, the hit rate of the prediction model may be determined based on the actual execution result of the random I/O operation. When the hit rate of the prediction model does not meet the requirements, the prediction model (e.g., its parameters) may be updated. The updated prediction model may be used to estimate the storage area in the storage device to be accessed by a subsequent upcoming random I/O operation. In this way, the prediction model may be continuously updated as the cache pre-fetch is performed.

Figure 4:
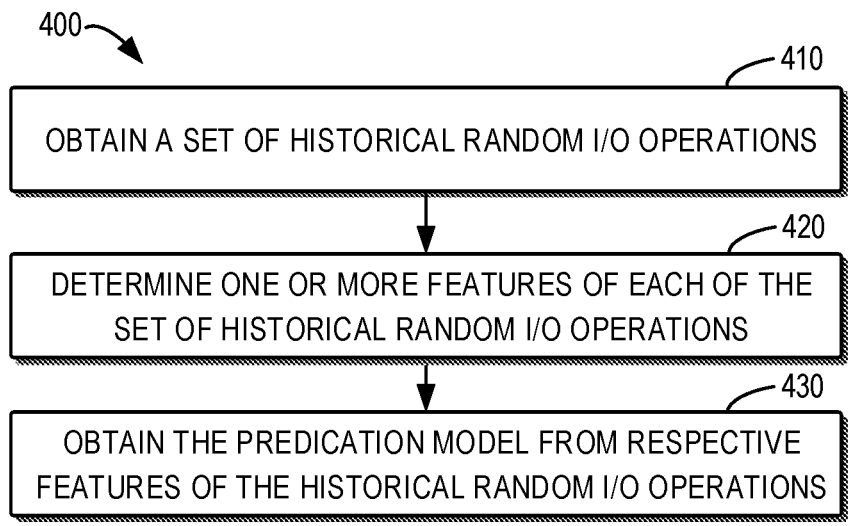
FIG. 4 illustrates a flowchart of an example method for obtaining a prediction model according to embodiments of the present disclosure.

FIG. 4 illustrates a flowchart of an example method 400 for obtaining a prediction model in accordance with an embodiment of the present disclosure. The method 400 may be performed for example at the storage processor 120 as shown in FIG. 1. It is to be understood that the method 400 may also include additional blocks not shown and/or may omit the illustrated blocks, and the scope of the present disclosure is not limited in this respect.

At block 410, the storage processor 120 obtains a set of historical random I/O operations as a training data set. In some embodiments, historical random I/O operations that actually happened within a predetermined time interval may be collected as the training data set.

At block 420, one or more features of each historical random I/O operation in the training data set are determined. In some embodiments, an address range, a size of the data requested to be accessed, a priority, a type and the like can be determined for each historical random I/O operation. In this way, each I/O operation X may be represented by a feature vector composed of a plurality of features: $X=\{x_1, x_2, \ldots x_n\}$, where $n \geq 1$ and $x_i$ (where $i \geq 1$ and $i \leq n$) indicates a feature of this I/O operation.

At block 430, a prediction model is obtained from respective features of the historical random I/O operations in the training data set.

In some embodiments, it is assumed that there are m address ranges based on an address incremental order. For example, a first address range is from 0x0 to 0x100000 (denoted as "0x0: 0x100000"), a second address range is from 0x100000 to 0xA00000, etc. The trained prediction model may predict which one of the m address ranges the upcoming I/O operation belongs to. Based on the principle of Bayesian inference discussed above, this corresponds to determining the maximum posteriori probability $P(C_i|X)$, where $C_i$ indicates that the address range of the I/O operation belongs to the $i^{th}$ address range in the m address ranges, and X Represents the feature of the I/O operations observed from the training data set. According to the above Equation (1), in order to obtain the maximum $P(C_i|X)$, it is needed to obtain the maximum $P(X|C_i)P(C_i)/P(X)$, where $P(X)$ may be a constant for a given application that issues an I/O request. Therefore, it is only needed to calculate a maximum value of $P(X|C_i)P(C_i)$. In some embodiments, for the m address ranges, it may be generally assumed that the prior probabilities of these address ranges are the same, i.e., $P(C_1)=P(C_2)=\ldots=P(C_m)$, where $P(C_i)$ ($i \geq 1$ and $i \leq m$) may be calculated based on the training data set. $P(X|C_i)$ may also be calculated based on the training data set. However, since each I/O operation in the training data set contains multiple features, multiple iterations may need to be performed to determine each of $P(X_1|C_i), P(X_1|C_i), \ldots P(X_n|C_i)$. In this way, $P(X|C_i)$ and $P(C_i)$ can be obtained from the training data set to derive the posterior probability $P(C_i|X)$, thereby obtaining the initial prediction model. The initial prediction model can estimate the category (i.e., the involved address range) to which the upcoming I/O operation belongs.

When the storage area involved in the upcoming I/O operation is estimated, at block 320, the storage processor 120 will pre-fetch data (hereinafter referred to as "first data") in the estimated storage area from the estimated storage area into the cache 121 associated with storage device 130 before the random I/O operation is actually performed.

In some embodiments, in response to estimating the address range involved in the upcoming random I/O operation, the memory processor 120 as shown in FIG. 1 may perform a cache pre-fetch operation. Specifically, the storage processor 120 may read data from the estimated storage area and store the read data into the cache 121 before the random I/O operation is performed.

As described above, in some embodiments, the storage processor 120 may determine the hit rate of the prediction model based on the random I/O operations that actually happened, and then update the prediction model based on the hit rate.

Figure 5:
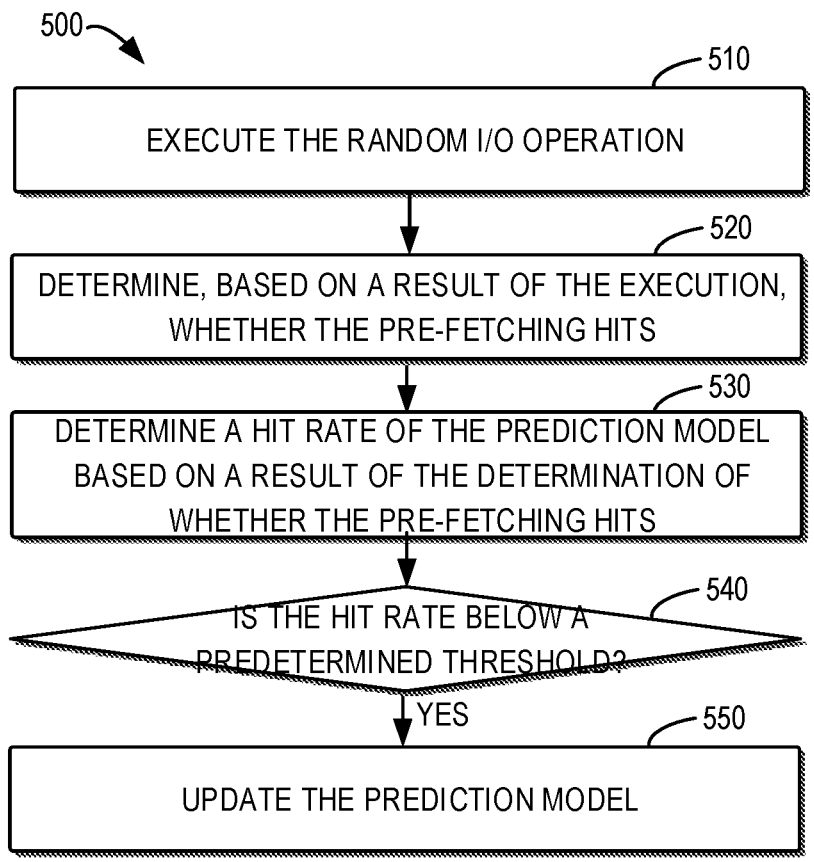
FIG. 5 illustrates a flowchart of an example method for updating the prediction model according to embodiments of the present disclosure.

FIG. 5 illustrates a flowchart of an example method 500 for updating the prediction model in accordance with an embodiment of the present disclosure. For example, the method 500 may be performed subsequent to the method 300. It is to be understood that the method 500 may also include additional blocks not shown and/or may omit the illustrated blocks, and the scope of the present disclosure is not limited in this respect.

At block 510, the storage processor 120 executes a random I/O operation. In some embodiments, in response to determining that the random I/O operation accesses the second storage area in the storage device, the storage processor 120 may determine whether the second data stored in the second storage area is pre-fetched into the cache 121. If the second data has been pre-fetch into the cache 121, the second data may be accessed from the cache 121; otherwise, the second data may be accessed from the storage device 130.

At block 520, the storage processor 120 determines whether the cache pre-fetch hits based on an execution result of the random I/O operation. In some embodiments, if the second storage area that the random I/O request actually requests to access is included in the estimated first storage area, it may indicate that the cache pre-fetch hits; otherwise, it may indicate that the cache pre-fetch misses.

At block 530, the storage processor 120 determines a hit rate of the prediction model based on a result of the determination result of whether the cache pre-fetch hits. At block 540, the storage processor 120 determines if the hit rate of the prediction model is below a predetermined threshold.

Figure 6:
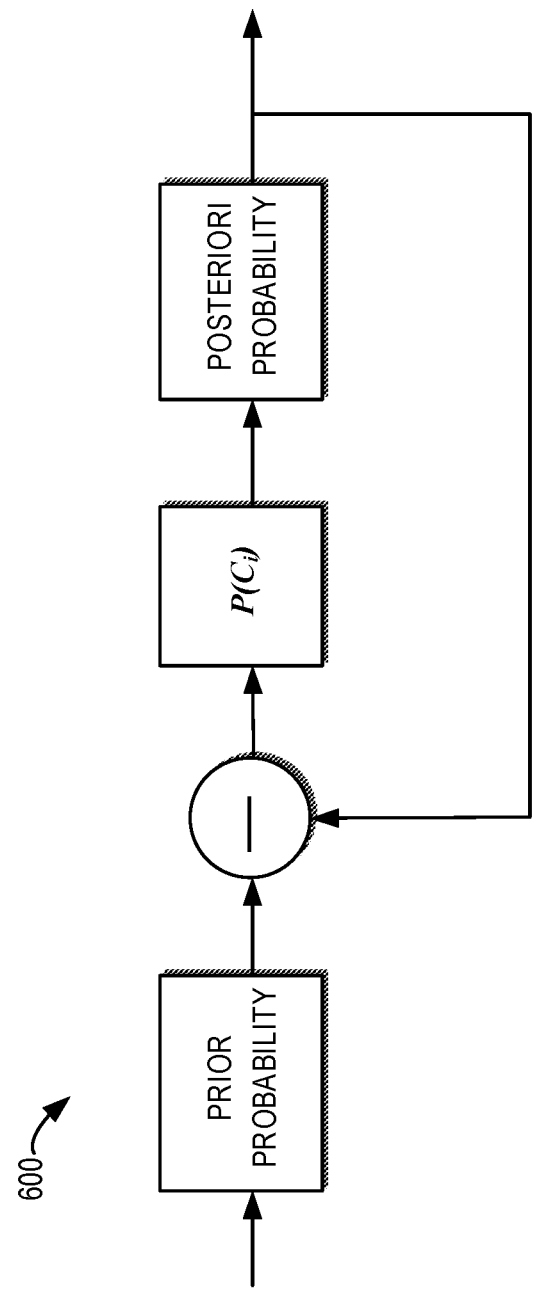
FIG. 6 illustrates a schematic diagram of an auto-feedback system for updating the prediction model according to embodiments of the present disclosure.

If the hit rate of the prediction model is below the predetermined threshold, at block 550, the prediction model may be updated. In some embodiments, the prediction model may be updated by obtaining and using a new training data set. Additionally or alternatively, in other embodiments, the posteriori probability $P(C_i|X)$ obtained above may be taken as a new prior probability $P(C_i)$, and then a new posterior probability $P(C_i|X)$ may be calculated. This approach is equivalent to using new evidence to update the probability, and it is also called probability self-iteration. As shown in FIG. 6, it actually forms a negative self-feedback system 600. The cache pre-fetch hit rate is an indicator for evaluating the system. In the system 600, the cache pre-fetch hit rate will track changes in the I/O pattern. By selecting the appropriate model parameters, the cache pre-fetch hit rate is enabled to follow the changes in the I/O pattern faster.

In some embodiments, cache pre-fetch may be performed for a read operation. Additionally or alternatively, cache pre-fetch may also be performed for a write operation. Although the embodiments of the present disclosure are described herein by taking a cache pre-fetch for a read operation as an example, it is to be understood that this is merely for the purpose of illustration, without suggesting any limitation to the scope of the present disclosure. Embodiments of the present disclosure are also applicable to write operations.

In some embodiments, the above pre-fetch mechanism for random I/O operations may be combined with a conventional pre-fetch mechanism for sequential I/O operations, so as to implement cache pre-fetch for various I/O patterns. Additionally or alternatively, when performing the cache pre-fetch for random I/O operations, any of the two mechanisms of read more and read ahead as shown in FIG. 2 may be employed, where the pre-fetch address range is an address range estimated based on the prediction mechanism described above. Moreover, in practice, a cache pre-fetch manager specific for random I/O operations can be implemented at the storage processor 120 as shown in FIG. 1, so as to implement the above cache pre-fetch mechanism. In some embodiments, the cache pre-fetch manager may be controlled by a finite state machine.

Figure 7A:
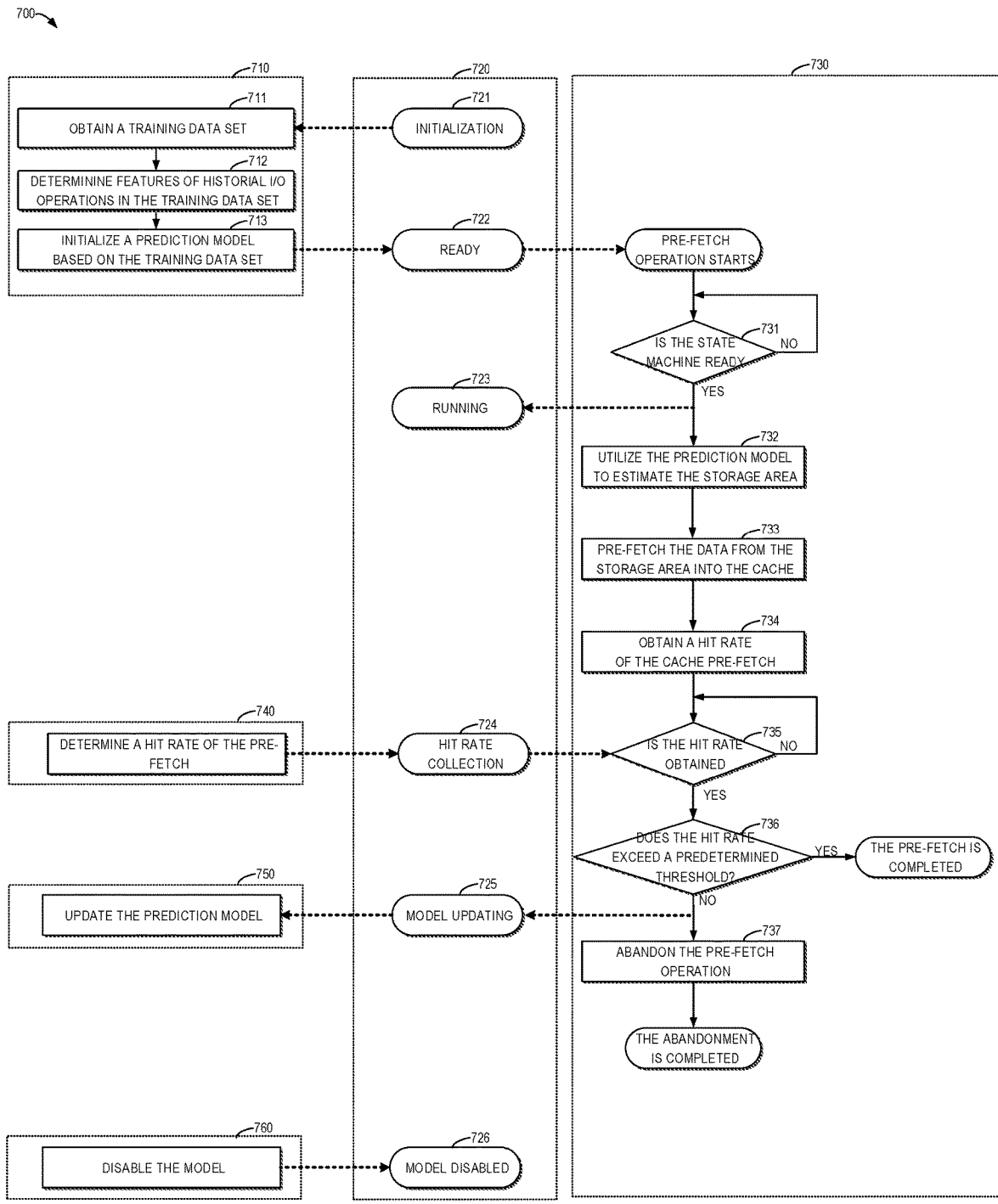
FIG. 7A illustrates a schematic block diagram of a cache pre-fetch manager implementing cache pre-fetching for random I/O operations according to embodiments of the present disclosure.

FIG. 7A shows a schematic block diagram of an example manager 700 for implementing the cache pre-fetch for a random I/O operation in accordance with an embodiment of the present disclosure. The manager 700 may be implemented for example at the storage processor 120 as shown in FIG. 1. As shown in FIG. 7A, for example, the manager 700 may include a plurality of processes 710, 730, 740, 750, and 760 execution of which can be triggered by an internal state machine 720 of the manager 700 and will cause state switching of the state machine 720.

As shown in FIG. 7A, initially, the state machine 720 is in an initialization state 721. The initialization state 721 will trigger the execution of the process 710 for obtaining an initial prediction model. The process 710 is similar to the method 400 as described in FIG. 4 and will not be described again herein. When the prediction model is obtained, the state machine 721 transitions from the initialization state 721 to a ready state 722. The ready state 722 will trigger the execution of the process 730 for performing cache pre-fetch.

As shown by the process 730, at block 731, it is determined whether the state machine 720 is in the ready state 722 (i.e., determine whether the initial prediction model has already been obtained). If it is determined at block 731 that the state machine 720 is not in the ready state 722, it is needed to wait for the state of the state machine 720 to transition to the ready state 722.

If the state machine 720 is in the ready state 722, then the process 730 proceeds to block 732 to utilize the prediction model to estimate the storage area involved in an upcoming I/O operation, while the state machine 720 transitions from the ready state 722 to a running state. 723. At block 733, the data is pre-fetched from the estimated storage area into the cache.

At block 734, a hit rate of the cache pre-fetch is obtained. For example, the determination of the hit rate of the cache pre-fetch may be performed in the background by a separate process 740. When the hit rate of the cache pre-fetch is obtained, the state machine 720 will enter a hit rate collection state 724. At block 735, it is determined whether the hit rate is obtained. If it is determined that the hit rate has not yet been obtained, it is needed to wait for the process 740 to determine the cache pre-fetch hit rate.

If it is determined that the hit rate has been obtained, then at block 736, it is determined whether the hit rate exceeds a predetermined threshold. If the hit rate exceeds the predetermined threshold, it may indicate that the hit rate of the prediction model meets the requirements and may not need to be updated. At this point, the pre-fetch operation is completed.

If the hit rate is below the predetermined threshold, the pre-fetch operation is abandoned at block 737, while the state of state machine 720 transitions to a model updating state 725. The model updating state 725 will trigger the execution of the process 750 to update the prediction model.

In addition, the state machine 720 also includes a model disabled state 726. For example, when the process 760 disables the prediction model, the state of the state machine 720 transitions to the model disabled state 726, where the prediction for the random I/O operation by the prediction model will be disabled.

Figure 7B:
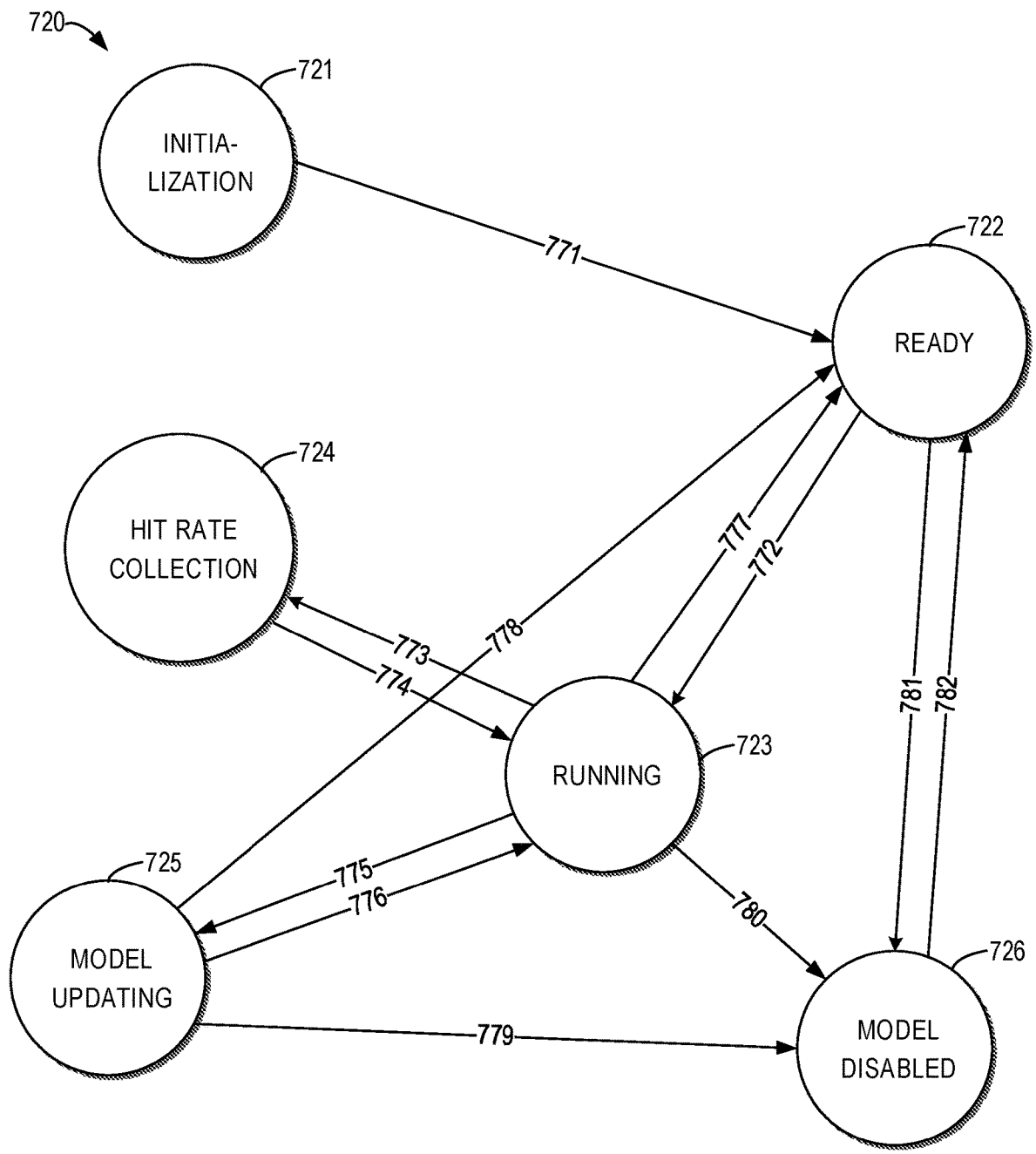
FIG. 7B illustrates a schematic diagram of a finite state machine in the cache pre-fetch manager according to embodiments of the present disclosure.

FIG. 7B shows a schematic diagram of state switching of the state machine 720 as shown in FIG. 7A. As shown in FIG. 7B, initially, the state machine 720 is in the initialization state 721. When the state machine 720 is in the initialization state 721, the manager 700 will obtain the initial prediction model based on the training data set. After the initial prediction model is obtained, the state machine 720 transitions 771 from the initialization state 721 to the ready state 722.

When the state machine 720 is in the ready state 722, the manager 700 will utilize the prediction model to estimate the storage area involved in the upcoming I/O operation and perform the cache pre-fetch based on the estimated storage area. In the meantime, the state machine 720 transitions 772 from the ready state 722 to the running state 723.

When execution of the cache pre-fetch is completed, the state machine 720 transitions 773 from the running state 723 to the hit rate collection state 724, and after the hit rate is collected, the state machine 720 returns 774 from the hit rate collection state 724 to the running state 723. If the hit rate exceeds the predetermined threshold, the state machine 720 returns 777 from the running state 723 to the ready state 722 for the next cache pre-fetch.

If the hit rate is below the predetermined threshold, the state machine 720 transitions 775 from the running state 723 to the model updating state 725. When the updating of the model is completed, the state machine returns 776 to the running state 723 to continue the current round of execution, or returns 778 to the ready state 722 for the next cache pre-fetch.

In addition, when the state machine 720 is in the ready state 722, the running state 723, or the model updating state 725, if the model is disabled, the state machine 720 transitions 779, 780, 781 from the above state to the model disabled state 726. When the model is re-activated, the state machine 720 returns (782) from the model disabled state 726 to the ready state 722.

It can be seen from the above description that, embodiments of the present disclosure implement a new pre-fetch mechanism for random I/O operations based on a statistical method. Traditional schemes may still be used for sequential I/O operations. This enables the scheme to implement cache prefetching for both the sequential I/O pattern and the random I/O pattern, thereby improving the overall performance of the system. Furthermore, embodiments of the present disclosure enable the prediction of the pattern of future I/O operations, and automatically adjust the parameters of the prediction model, so as to improve the hit rate of the cache pre-fetch for random I/O operations.

Figure 8:
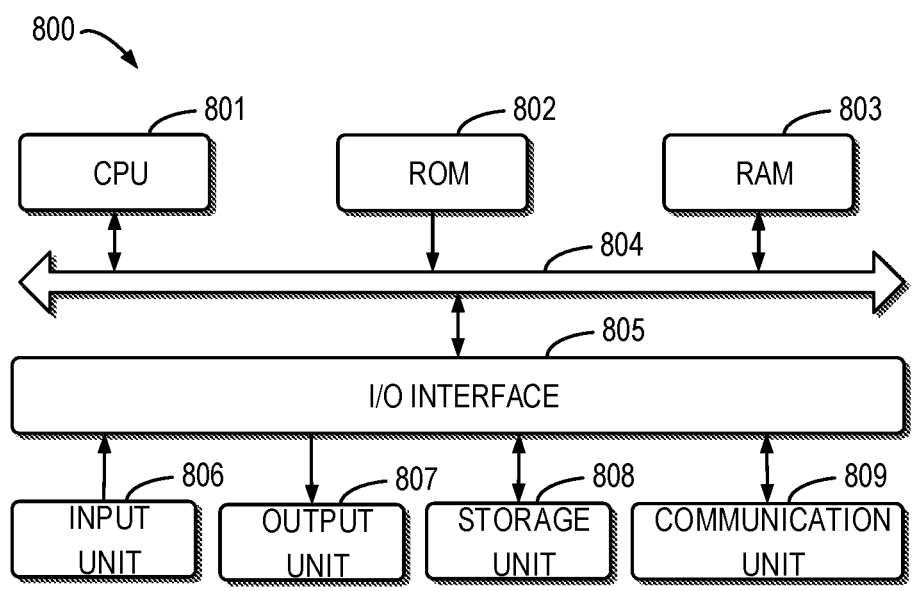
FIG. 8 illustrates a schematic block diagram of an example device that can be used to implement embodiments of the present disclosure.

FIG. 8 illustrates a block diagram of an example device 800 adapted to implement an embodiment of the present disclosure. For example, the storage processor 120 as shown in FIG. 1 may be implemented by the device 800. As shown in FIG. 8, the device 800 includes a central processing unit (CPU) 801 that may perform various appropriate actions and processing based on computer program instructions stored in a read-only memory (ROM) 802 or computer program instructions loaded from a memory unit 808 to a random access memory (RAM) 803. In the RAM 803, there further store various programs and data needed for operations of the device 800. The CPU 801, ROM 802 and RAM 803 are connected to each other via a bus 804. An input/output (I/O) interface 805 is also connected to the bus 804.

Various components in the device 800 are connected to the I/O interface 805, including: an input unit 806 such as a keyboard, a mouse and the like; an output unit 808 including various kinds of displays and a loudspeaker, etc.; a storage unit 808 including a magnetic disk, an optical disk, and etc.; a communication unit 809 including a network card, a modem, and a wireless communication transceiver, etc. The communication unit 809 allows the device 800 to exchange information/data with other devices through a computer network such as the Internet and/or various kinds of telecommunications networks.

Various processes and processing described above, e.g., method 300, 400, 500 and/or process 710, 730, 740, 750 and/or 760 may be executed by the processing unit 801. For example, in some embodiments, method 300, 400, 500 and/or process 710, 730, 740, 750 and/or 760 may be implemented as a computer software program that is tangibly included in a machine readable medium, e.g., the storage unit 808. In some embodiments, part or all of the computer program may be loaded and/or mounted onto the device 800 via ROM 802 and/or communication unit 809. When the computer program is loaded to the RAM 803 and executed by the CPU 801, one or more acts of the method 300, 400, 500 and/or process 710, 730, 740, 750 and/or 760 as described above may be executed.

The present disclosure may be a method, apparatus, system and/or computer program product. The computer program product may include a computer readable storage medium on which computer readable program instructions for executing various aspects of the present disclosure are embodied.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processing unit of a general purpose computer, special purpose computer, or other programmable data processing apparatus to produce a machine, such that the instructions, which execute via the processor of the computer or other programmable data processing apparatus, create means (e.g., specialized circuitry) for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for managing an input/output (I/O) operation, comprising:
    obtaining a set of historical random I/O operations as a training data set;
    determining features of the respective historical random I/O operations in the training data set;
    obtaining a prediction model from the features of the respective historical random I/O operations in the training data set;
    predicting, by the prediction model, a first storage area in a storage device to be accessed by an upcoming random I/O operation, the predicted first storage area storing first data; and
    before the upcoming random I/O operation is executed, pre-fetching the first data from the first storage area into a cache associated with the storage device, the storage device comprising a plurality of storage areas, the plurality of storage areas including the first storage area, wherein predicting the first storage area by the prediction model comprises:
        estimating a plurality of probability values for the plurality of storage areas, respectively, each probability value for each respective storage area representing a probability that the respective storage area is to be accessed by the upcoming random I/O operation;
        determining a highest probability value from among the estimated plurality of probability values for the plurality of storage areas, respectively; and
        predicting the first storage area in the storage device to be accessed by the upcoming random I/O operation in response to the highest probability value being determined for the first storage area,
    wherein the prediction model is obtained based on Bayesian inference, wherein the plurality of storage areas correspond to a plurality of address ranges of the respective historical random I/O operations in the training data set, and wherein determining the highest probability value from among the estimated plurality of probability values for the plurality of storage areas comprises:
        obtaining a maximum value of $P(X|C_i)P(C_i)$,
    wherein "X" represents a feature from among the features of the respective historical random I/O operations, wherein "$C_i$" indicates that an address range from among the plurality of address ranges belongs to an $i^{th}$ address range of the plurality of address ranges based on an address incremental order, wherein "$P(X|C_i)$" is a probability of "X" given "$C_i$", wherein "$P(C_i)$" is a probability of observing "$C_i$" given "X", and wherein "$P(X)$" is a probability of observing "X" given "$C_i$", "$P(X)$" being constant for a given application that issues an I/O request.

2. The method according to claim 1, wherein obtaining the prediction model comprises:
    obtaining a set of historical random I/O operations;
    determining one or more features of each of the set of historical random I/O operations; and
    obtaining the prediction model from respective features of the historical random I/O operations in the set of historical random I/O operations.

3. The method according to claim 1, further comprising:
    executing the random I/O operation;
    determining, based on a result of the execution, whether the pre-fetching hits;
    determining a hit rate of the prediction model based on a result of the determination of whether the pre-fetching hits; and
    updating the prediction model in response to the hit rate being below a predetermined threshold.

4. The method according to claim 3, wherein executing the random I/O operation comprises:
    in response to determining that the random I/O operation accesses a second storage area in the storage device, determining whether second data stored in the second storage area is pre-fetched into the cache;
    in response to determining that the second data is pre-fetched into the cache, accessing the second data from the cache; and
    in response to determining that the second data is missing in the cache, accessing the second data from the storage device.

5. The method according to claim 3, wherein determining whether the pre-fetching hits comprises:
    in response to determining that the random I/O operation accesses a second storage area in the storage device, determining whether the second storage area is included in the predicted first storage area;
    in response to determining that the second storage area is included in the first storage area, determining that the pre-fetching hits; and
    in response to determining that the second storage area is absent in the first storage area, determining that the pre-fetching misses.

6. The method according to claim 1, wherein the random I/O operation is one of a random read operation and a random write operation.

7. The method according to claim 1, wherein the random I/O operation is triggered by a database associated with the storage device.

8. The method according to claim 1 further comprising:
    accessing, by a pattern of I/O operations, the plurality of storage areas of the storage device;
    classifying a first portion of the pattern of I/O operations as a pattern of sequential I/O operations;

classifying a second portion of the pattern of I/O operations as a pattern of random I/O operations;

for the pattern of sequential I/O operations, pre-fetching data into the cache by a conventional pre-fetching scheme; and for the pattern of random I/O operations, pre-fetching data into the cache by a pre-fetching scheme based on the prediction model.

9. An apparatus for managing an input/output (I/O) operation, comprising:

at least one processor; and at least one memory coupled to the at least one processor and storing instructions for execution by the at least one processor, the instructions, when executed by the at least one processor, causing the apparatus to perform acts comprising:

obtaining a set of historical random I/O operations as a training data set;

determining features of the respective historical random I/O operations in the training data set;

obtaining a prediction model from the features of the respective historical random I/O operations in the training data set;

predicting, by the prediction model, a first storage area in a storage device to be accessed by an upcoming random I/O operation, the predicted first storage area storing first data; and before the upcoming random I/O operation is executed, pre-fetching the first data from the first storage area into a cache associated with the storage device, the storage device comprising a plurality of storage areas, the plurality of storage areas including the first storage area, wherein predicting the first storage area by the prediction model comprises:

estimating a plurality of probability values for the plurality of storage areas, respectively, each probability value for each respective storage area representing a probability that the respective storage area is to be accessed by the upcoming random I/O operation;

determining a highest probability value from among the estimated plurality of probability values for the plurality of storage areas, respectively; and predicting the first storage area in the storage device to be accessed by the upcoming random I/O operation in response to the highest probability value being determined for the first storage area, wherein the prediction model is obtained based on Bayesian inference, wherein the plurality of storage areas correspond to a plurality of address ranges of the respective historical random I/O operations in the training data set, and wherein determining the highest probability value from among the estimated plurality of probability values for the plurality of storage areas comprises:

obtaining a maximum value of $P(X|C_i)P(C_i)$, wherein "$X$" represents a feature from among the features of the respective historical random I/O operations, wherein "$C_i$" indicates that an address range from among the plurality of address ranges belongs to an $i^{th}$ address range of the plurality of address ranges based on an address incremental order, wherein "$P(X|C_i)$" is a probability of "$X$" given "$C_i$", wherein "$P(C_i)$" is a probability of observing "$C_i$" given "$X$", and wherein "$P(X)$" is a probability of observing "$X$" given "$C_i$", "$P(X)$" being constant for a given application that issues an I/O request.

10. The apparatus according to claim 9, wherein obtaining the prediction model comprises:

obtaining a set of historical random I/O operations;

determining one or more features of each of the set of historical random I/O operations; and obtaining the prediction model from respective features of the historical random I/O operations in the set of historical random I/O operations.

11. The apparatus according to claim 9, wherein the acts further comprise:

executing the random I/O operation;

determining, based on a result of the execution, whether the pre-fetching hits;

determining a hit rate of the prediction model based on a result of the determination of whether the pre-fetching hits; and updating the prediction model in response to the hit rate being below a predetermined threshold.

12. The apparatus according to claim 11, wherein executing the random I/O operation comprises:

in response to determining that the random I/O operation accesses a second storage area in the storage device, determining whether second data stored in the second storage area is pre-fetched into the cache;

in response to determining that the second data is pre-fetched into the cache, accessing the second data from the cache; and in response to determining that the second data is missing in the cache, accessing the second data from the storage device.

13. The apparatus according to claim 11, wherein determining whether the pre-fetching hits comprises:

in response to determining that the random I/O operation accesses a second storage area in the storage device, determining whether the second storage area is included in the predicted first storage area;

in response to determining that the second storage area is included in the first storage area, determining that the pre-fetching hits; and in response to determining that the second storage area is absent in the first storage area, determining that the pre-fetching misses.

14. The apparatus according to claim 9, wherein the random I/O operation is one of a random read operation and a random write operation.

15. The apparatus according to claim 9, wherein the random I/O operation is triggered by a database associated with the storage device.

16. A computer program product having a non-transitory computer readable medium which stores a set of instructions to manage an input/output (I/O) operation; the set of instructions, when carried out by computerized circuitry, causing the computerized circuitry to perform a method of:

obtaining a set of historical random I/O operations as a training data set;

determining features of the respective historical random I/O operations in the training data set;

obtaining a prediction model from the features of the respective historical random I/O operations in the training data set;

predicting, by the prediction model, a first storage area in a storage device to be accessed by an upcoming random I/O operation, the predicted first storage area storing first data; and before the upcoming random I/O operation is executed, pre-fetching the first data from the first storage area into a cache associated with the storage device, the storage device comprising a plurality of storage areas, the plurality of storage areas including the first storage area, wherein predicting the first storage area by the prediction model comprises:
  estimating a plurality of probability values for the plurality of storage areas, respectively, each probability value for each respective storage area representing a probability that the respective storage area is to be accessed by the upcoming random I/O operation;
  determining a highest probability value from among the estimated plurality of probability values for the plurality of storage areas, respectively; and
  predicting the first storage area in the storage device to be accessed by the upcoming random I/O operation in response to the highest probability value being determined for the first storage area, wherein the prediction model is obtained based on Bayesian inference, wherein the plurality of storage areas correspond to a plurality of address ranges of the respective historical random I/O operations in the training data set, and wherein determining the highest probability value from among the estimated plurality of probability values for the plurality of storage areas comprises:
  obtaining a maximum value of $P(X|C_i)P(C_i)$, wherein "X" represents a feature from among the features of the respective historical random I/O operations, wherein "$C_i$" indicates that an address range from among the plurality of address ranges belongs to an $i^{th}$ address range of the plurality of address ranges based on an address incremental order, wherein "$P(X|C_i)$" is a probability of "X" given "$C_i$", wherein "$P(C_i)$" is a probability of observing "$C_i$" given "X", and wherein "$P(X)$" is a probability of observing "X" given "$C_i$", "$P(X)$" being constant for a given application that issues an I/O request.

17. The method according to claim 16, wherein the method further comprises:
  executing the random I/O operation;
  having executed the random I/O operation, determining whether the pre-fetching of the first data results in a hit;
  in response to determining that the pre-fetching of the first data results in the hit, determining a hit rate of the prediction model; and
  in response to the determined hit rate being below a predetermined threshold, performing Bayesian updating of the prediction model.

* * * * *